(12) United States Patent
Miyazaki

(10) Patent No.: US 8,181,682 B2
(45) Date of Patent: May 22, 2012

(54) PNEUMATIC TIRE

(75) Inventor: Tetsuji Miyazaki, Osaka-fu (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 778 days.

(21) Appl. No.: 12/267,672

(22) Filed: Nov. 10, 2008

(65) Prior Publication Data

US 2009/0145529 A1 Jun. 11, 2009

(30) Foreign Application Priority Data

Dec. 10, 2007 (JP) ................................. 2007-318127

(51) Int. Cl.
*B60C 11/00* (2006.01)

(52) U.S. Cl. ............. 152/209.21; 152/209.1; 152/209.2; 152/209.3; 152/209.24; 152/209.18

(58) Field of Classification Search ............... 152/209.1, 152/209.2, 209.3, 209.21, 209.24, 209.18

See application file for complete search history.

(56) References Cited

U.S. PATENT DOCUMENTS

| | | | |
|---|---|---|---|
| 5,147,478 A * | 9/1992 | Nock et al. | 152/209.21 |
| 2005/0076986 A1* | 4/2005 | Saguchi | 152/209.21 |
| 2006/0011279 A1* | 1/2006 | Miyasaka | 152/209.15 |

FOREIGN PATENT DOCUMENTS

| | | |
|---|---|---|
| EP | 0 069 464 | 1/1983 |
| EP | 0 393 873 | 10/1990 |
| EP | 0 855 292 | 7/1998 |
| JP | 01-223006 | 9/1989 |
| JP | 09-300915 | 11/1997 |
| JP | 2001-354011 | 12/2001 |
| WO | WO 97/32741 | 9/1997 |

* cited by examiner

*Primary Examiner* — Matthew Daniels
*Assistant Examiner* — Jacob Thomas Minskey
(74) *Attorney, Agent, or Firm* — Fish & Richardson P.C.

(57) ABSTRACT

In a tire, a phase difference L1 of transverse grooves 2 is within 25% of the length L of blocks 3, the projected portions 11 are alternately on both sidewalls 10, L2 of the portion 11 is 20% to 45% of L, and in the cross-section of the width direction of the main groove 1, the edge 15 of the portion 11 at the groove bottom is more of a sidewall 10 side than a center line 19 of the groove 1, the outline of the portion 11 is at least on a virtual surface 17 that connects the edge 13 of the groove 1 at the tread surface and the edge 15. The tire also has one or a plurality of sub-projected portions 21, 22 projected from the surface 17.

4 Claims, 3 Drawing Sheets

PNEUMATIC TIRE

CROSS-REFERENCE TO RELATED APPLICATION

This application claims the benefit of priority based on Japanese Patent Application No. 2007-318127, the entire same contents of which are incorporated by reference herein.

BACKGROUND OF THE INVENTION

1. Field of the Invention

The present invention relates to a pneumatic tire with maintained or improved drainage performance and traction performance, and with reduced tire noise.

2. Description of the Prior Art

In a pneumatic tire, sometimes rack portions are provided in a sidewall of a block (a sidewall of a main groove) in order to improve traction performance. For example, in the pneumatic tire disclosed in Patent Document 1 (Patent document 1: Unexamined Japanese Laid-Open Patent Publication No. 9-300915, FIGS. 1 and 2), stepped rack portions are provided in the sidewall of the block thereby improving traction performance. Also, the rack portions are alternately horizontally provided along the extending direction of the main groove thereby securing drainage performance inhibiting the degradation of drainage performance due to decrease in a volume of the main groove.

SUMMARY OF THE INVENTION

Since the rack portions are added to the entire sidewall of the block in the above mentioned pneumatic tire, the mass of the block increases. Therefore, impact noise to a road surface increases, giving rise to the problem of increased pitch noise. In particular, when the tire wear advances, the rack portions appear on a tread surface and the block width expands, which increases the impact noise.

In a state where the tire contacts the ground, a tubular space is formed by the main groove extending in the tire circumferential direction and the road surface. As the tire rotates, air compressed in the tubular space is released and as a result, air column resonance noise is generated. Air column resonance noise is offensive noise whose frequency is 700 to 1400 Hz. In the above mentioned pneumatic tire, although the rack portions can be resistant to air flow in the groove, it was not enough to effectively decrease air column resonance noise.

Therefore, the object of the present invention is to provide the pneumatic tire with maintained or improved drainage performance and traction performance, and with the reduced pitch noise and air column resonance noise.

The pneumatic tire of the present invention has the characteristics in that it is the pneumatic tire provided with main grooves extending in the tire circumferential direction and transverse grooves connected to the main grooves formed on a tread, and with blocks formed by the main grooves and the transverse grooves, wherein the phase difference of the two transverse grooves connected to the main groove is within 25% of the circumferential length of the blocks, and projected portions are alternately provided in both sidewalls of the main groove, the circumferential length of the projected portions is 20% to 45% of the circumferential length of the blocks, in the cross-section of the width direction of the main groove the edge of the projected portions at the groove bottom is more of a sidewall side than a center line of the main groove, and the outline of the projected portions is at least on a virtual surface that connects the edge of the main groove at the tread surface and the edge of the projected portions at the groove bottom, and the pneumatic tire is provided with one or plurality of sub-projected portions further projected on the virtual surface, the maximum width portion of each of the sub-projected portions being within the range of 30% to 80% of the depth of the main groove, and the width of the maximum width portion being at least not less than 1.0 mm.

First, by keeping the phase difference of the transverse groove within 25% of the circumferential length of the block, water flow in the transverse grooves with the main groove therebetween improves and drainage performance is secured. By alternately providing the projected portions in both sidewalls of the main groove and by keeping the circumferential length of the projected portions within 20% to 45% of the circumferential length of the block, the increase in the mass of the block is suppressed and further, the mass of each of the projected portions is reduced, and therefore, pitch noise can be reduced. Also, greater traction can be obtained due to the increased edge effect at the projected portions by the increased number of the projected portions. Moreover, since sub-projected portions further projected from the projected portion are provided, air column resonance noise can effectively be reduced by imparting greater resistance against the air flow in the main groove.

BRIEF DESCRIPTION OF THE DRAWINGS

FIG. 1b is a cross-sectional view taken along the line b-b of FIG. 1a.

FIG. 1c is a cross-sectional view taken along the line b-b of FIG. 1a.

FIG. 1d is a cross-sectional view taken along the line b-b of FIG. 1a.

FIG. 1e is a cross-sectional view taken along the line b-b of FIG. 1a.

FIG. 1f is a cross-sectional view taken along the line b-b of FIG. 1a.

DESCRIPTION OF THE PREFERRED EMBODIMENTS

Figure 1A:
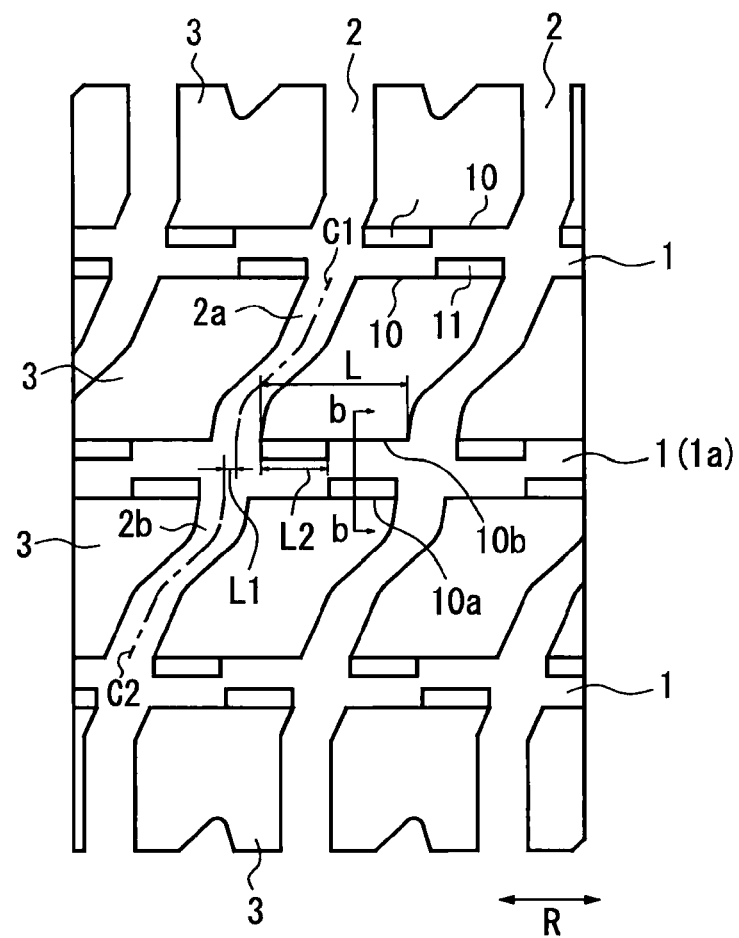
FIG. 1a is a view showing the tread pattern of the pneumatic tire related to the present invention.

Hereinafter, explanation on embodiments for carrying out the pneumatic tire of the present invention is made using drawings. FIG. 1a is a view showing the pattern of the pneumatic tire related to the present invention. The main groove 1 that extends in the circumferential direction R and the transverse grooves 2 that are connected to the main groove 1 are formed on the tread. By the main grooves 1 and the transverse grooves 2, the block 3 is formed.

The phase difference L1 of the transverse grooves 2 is within a quarter of the circumferential length L of the block 3. Water flow in the transverse grooves 2 with the main groove 1 therebetween improves and drainage performance is secured. When the phase difference L1 exceeds a quarter of the circumferential length L of the block 3, drainage performance in the tire width direction is degraded. Here, the phase difference L1 refers to the displacement in the circumferential direction compared with the center line in the width direction of the two transverse grooves 2 that are connected to the main groove 1. For example, it refers to the displacement L1 of the C1 that is the center line in the width direction of the transverse grooves 2a connected to the main groove 1a from one side, and the C2 that is the center line in the width direction of the transverse grooves 2a connected to the main groove 1a from the other side.

The projected portions 11 are alternately provided in the sidewall 10 of the main groove 1 (that are also the sidewall of the block 3). In other words, when the projected portion 11 is provided at a part 10a of the sidewall 10, the projected portion 11 is not provided at the part 10b of the opposing sidewall 10. And the projected portions 11 are alternately provided on both sides of the main groove 1 along the circumferential direction R.

Since the projected portions 11 are provided not in the entire sidewall 10 but in some parts thereof, compared with when the projected portions are provided in the entire sidewall 10, pitch noise can be reduced. Also, since the number of the projected portions 11 increases, greater resistance can be imparted against the air flow in the main groove 1, thereby effectively decreasing air column resonance noise. Further, greater traction can be obtained due to the increased edge effect at the projected portions 11 by the increased number of the projected portions 11.

It is preferable that L2 that is the circumferential length of the projected portion 11 is 20% to 45% of the length L of the block 3. When L2 is less than 20% of L, satisfactory traction performance may not be obtained and when L2 exceeds 45% of L, drainage performance may be degraded. In addition, two or more projected portions 11 may be provided separately in one sidewall and in such a case, L2 that is the circumferential length becomes the total sum of the length of the projected portions 11 provided in the sidewall of the block.

Figure 1B:
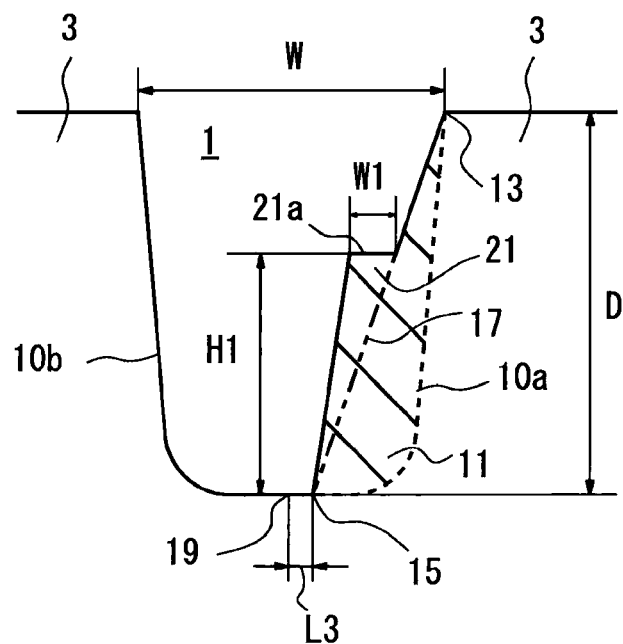

Next, the shape of the projected portion 11 in cross-section is explained. FIG. 1b is a cross-sectional view taken along the line b-b of FIG. 1a and it shows the cross-sectional view in the width direction of the main groove 1 of the projected portion 11. For explanation purposes, hatched lines are only on the projected portion 11. Since the edge 15 of the projected portion 11 at the groove bottom is more of the sidewall 10a side than the center line 19 of the main groove 1, drainage performance is secured.

Here, a virtual surface 17 that connects the edge 13 of the main groove 1 at the tread surface and the edge 15 of the projected portion 11 at the groove bottom is defined. The outline of the projected portion 11 is at least on the virtual surface 17 and is provided with the sub-projected portion 21 further projected from the virtual surface 17. In FIG. 1b, the sub-projected portion 21 is triangular shaped in cross section since the shape is provided with a rack surface 21a parallel to the tread surface, traction performance is improved due to the edge effect of the sub-projected portion 21. Also, a plurality of the sub-projected portions may be provided. The plurality of the sub-projected portions enables to obtain more edge effects. For example, in FIG. 1c, an example is shown in which two sub-projected portions 21 and 22 are provided and in FIG. 1d, another example is shown in which three sub-projected portions 21, 22, and 23 are provided. As shown in FIG. 1e, the sub-projected portions 21 and 22 need not be provided with the rack portion, and in this case, one or a plurality of sub-projected portions may also be provided. In particular, with the shape of FIG. 1e, since the angle formed by the surfaces that make up the sub-projected portions approaches to 180 degrees, drainage resistance of the water flowing to the tread surface from the groove bottom of the main groove 1 is reduced, and drainage performance is improved.

Figure 1C:
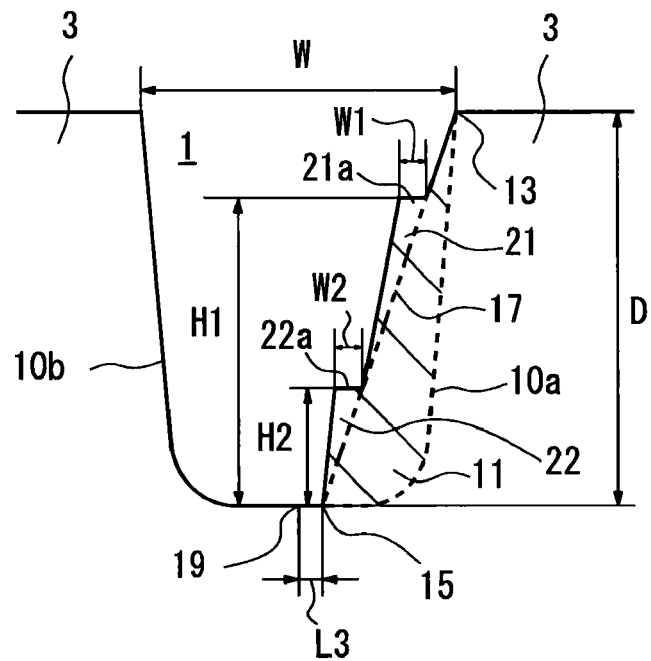
Figure 1D:
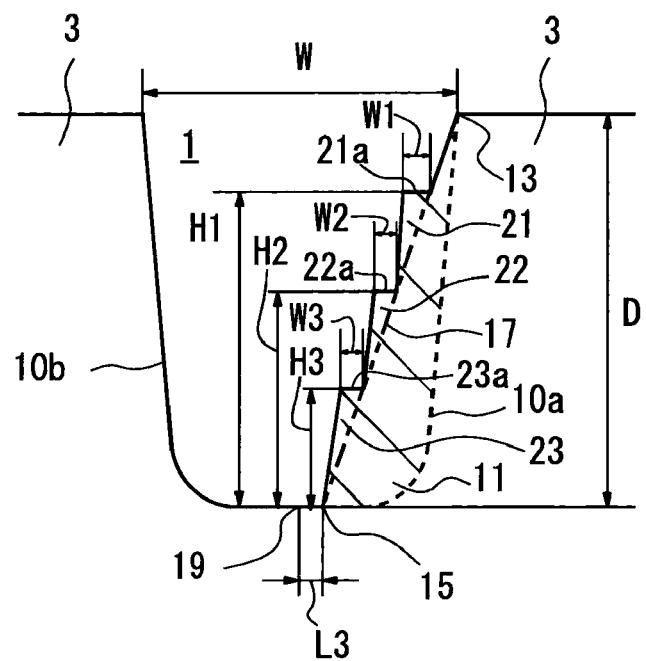
Figure 1E:
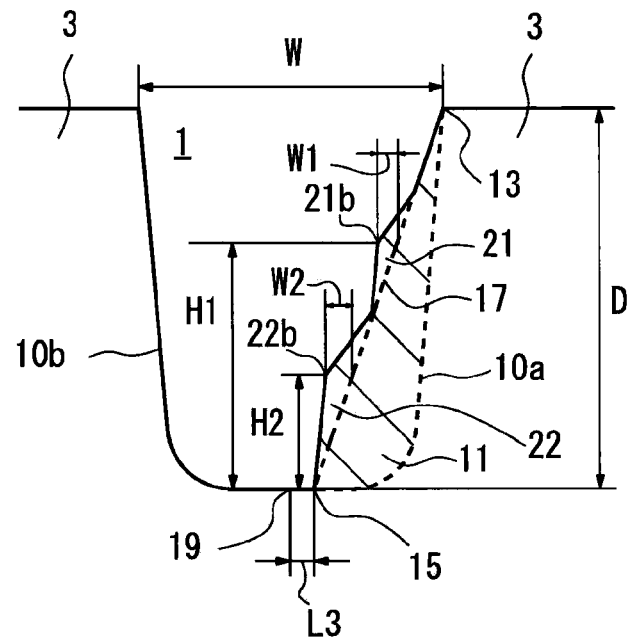
Figure 1F:
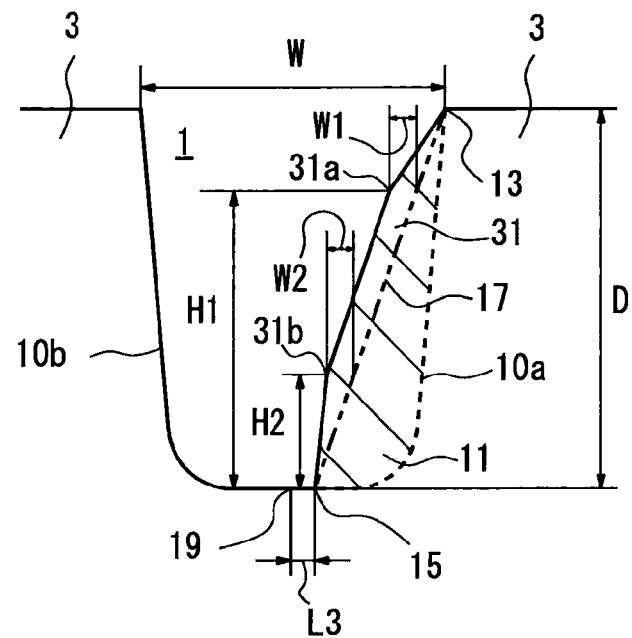

FIG. 1f shows another embodiment of the sub-projected portion. The shape of the sub-projected portion 31 may be quadrangular shaped in cross-section in which the sub-projected portion 31 is projected from the virtual surface 17 over the entire virtual surface 17 and one side thereof is on the virtual surface 17. In this case too, since the angle formed by the surfaces that make up the sub-projected portion 31 approaches to 180 degrees, drainage resistance of the water flowing to the tread surface from the groove bottom of the main groove 1 is reduced, and drainage performance is improved.

Further, it is preferable that the distance L3 from the center line 19 of the main groove 1 to the edge 15 at the groove is 2% to 25% of the width W of the main groove 1. When L3 is less than 2% of the width W, drainage performance is degraded and when L3 exceeds 25% of the width W, the edge effect by the sub-projected portions becomes smaller and traction performance is not so improved.

It is preferable that the maximum width portion of the sub-projected portions is within the range of 30% to 80% of the depth D of the main groove 1. In other words, in the cases of FIGS. 1b to 1d, the maximum width portion corresponds to the rack surface and it is preferable that H1 to H3 that are height of the rack surface 21a to 23a are within the range of 30% to 80% of the depth of the main groove 1. In FIG. 1e, the maximum width portion corresponds to each of the apexes 21a and 21b of a triangular shape that are not on the virtual surface 17 and it is preferable that its height H1 and H2 is within the range of 30% to 80% of the depth D of the main groove 1. In the case of FIG. 1f, the maximum width portion corresponds to each of the apexes 31a and 31b of a quadrangular shape that are not on the virtual surface 17 and it is preferable that its height H1 and H2 is within the range of 30% to 80% of the depth D of the main groove 1. In any case, when the height H1 to H3 is less than 30% of D, traction performance is not enough and when the height H1 to H3 exceeds 80% of D, the volume of the main groove 1 is reduced and drainage performance may be degraded.

In addition, from the view point of fully obtaining the edge effect, it is preferable that the width of the maximum width portion of the sub-projected portions is at least not less than 1.0 mm. In other words, in the cases of FIG. 1b to 1d, the width of the maximum width portion is the width W1 to W3 of the rack surfaces 21a to 23a. In the case of FIG. 1e, the maximum width portion is the width W1 and W2 that is the width from each of the apexes 21b and 22b of a triangular shape that are not on the virtual surface 17 to the virtual surface 17. In the case of FIG. 1f, the maximum width portion is the width W1 and W2 that is the width from each of the apexes 31a and 31b of the quadrangular shape that are not on the virtual surface 17 to the virtual surface 17. In any case, the width W1 to W3 is the range until the sidewall of the sub-projected portions and the like becomes perpendicular to the groove bottom and it is preferable that the width W1 to W3 is not less than 1.0 mm. When the width is inclined to the sidewall side of the opposing main groove with the angle exceeding perpendicular, drainage performance is degraded.

Since the projected portions 11 are provided with the sub-projected portions 21 and the like further protruded from the virtual surface 17, compared with conventional shapes in which the rack portion is directly provided from the sidewalls 10a and 10b of the main groove 1, the angle formed by the surfaces that make the projected portion 11 approaches to 180 degrees. As a result, the cracks generated in the projected portion 11 can be prevented.

EXAMPLE

Tires for Examples and those for Comparative Examples related to the present invention were manufactured and evaluation was made on each of them. The tires for each Example are the ones provided with a pattern shown in FIG. 1a and with the projected portions 11 shown in FIG. 1b to 1f. On the other hand, although the tire for Comparative Example 1 is provided with the projected portions 11 with the same shape as that of Example 1, the projected portions 11 are provided on the entire sidewall of the block. In the tires of Comparative Examples 2 to 7, the size of the projected portion 11 is different from that of the Examples. The evaluation was made under the condition that the tire size was LT265/75R16 and air pressure was 420 kPa. For information, the size of the projected portion is shown in Table 1.

In the Table 1, air column resonance noise is the value obtained by measuring the noise level of air column resonance noise (700 to 1400 Hz) of a new tire with an in-room acoustic drum tester based on JASO C606 and it is shown by index letting the value of Comparative Example 1 100 and the larger numerical value shows the lower level of air column resonance noise. In other tests, the evaluation was made with the tires installed on a four-wheel drive truck equipped with a 6600 cc diesel engine.

Drainage performance is the value of speed at which hydroplaning is acknowledged when driving the car with a new tire on a wet road surface with water depth of 8 mm accelerating the speed gradually, and it is shown by index letting the value of Comparative Example 1 as 100 and the larger numerical value shows the better drainage performance. Traction performance is the lap time when driving off-road course and it is shown by index letting the value of Comparative Example 1 as 100 and the larger numerical value shows the shorter lap time.

Pitch noise is the value evaluated by sensory evaluation of pitch noise when driving the car on a usual road in a state where the tread is worn by 50% of D that is the depth of the main groove, and it is shown by index letting the value of Comparative Example 1 as 100 and the larger numerical value shows the lower level of pitch noise.

TABLE 1

| | Example | | | | | | | | Comparative Example | | | | | | |
|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 |
| Phase difference of transverse grooves L1/L (%) | 0 | 0 | 0 | 25 | 0 | 0 | 0 | 0 | 0 | 0 | 0 | 0 | 30 | 0 | 0 |
| Length of projected portion L2/L (%) | 35 | 45 | 20 | 45 | 35 | 35 | 35 | 35 | 100 | 45 | 20 | 45 | 45 | 60 | 70 |
| L3/W1 (%) | 10 | 2 | 25 | 10 | 10 | 2 | 2 | 10 | 10 | 0 | 25 | 2 | 10 | 10 | 10 |
| Height of sub-projected portion H1/D (%) | 70 | 80 | 30 | 70 | 70 | 80 | 70 | 70 | 70 | 80 | 25 | 85 | 70 | 70 | 70 |
| Width of sub-projected portion W1 (mm) | 3.0 | 3.0 | 1.0 | 3.0 | 1.5 | 1.5 | 1.5 | 1.0 | 3.0 | 3.0 | 1.0 | 3.0 | 3.0 | 3.0 | 3.0 |
| Height of sub-projected portion H2/D (%) | — | — | — | — | 30 | 50 | 30 | 30 | — | — | — | — | — | — | — |
| Width of sub-projected portion W2 (mm) | — | — | — | — | 1.0 | 1.0 | 1.0 | 1.0 | — | — | — | — | — | — | — |
| Height of sub-projected portion H3/D (%) | — | — | — | — | — | 30 | — | — | — | — | — | — | — | — | — |
| Width of sub-projected portion W3 (mm) | — | — | — | — | — | 1.0 | — | — | — | — | — | — | — | — | — |
| Shape of projected portion | FIG. 1b | FIG. 1b | FIG. 1b | FIG. 1b | FIG. 1c | FIG. 1d | FIG. 1e | FIG. 1f | FIG. 1b | FIG. 1b | FIG. 1b | FIG. 1b | FIG. 1b | FIG. 1b | FIG. 1b |
| Drainage performance | 105 | 98 | 113 | 101 | 107 | 105 | 107 | 107 | 100 | 106 | 114 | 106 | 105 | 96 | 105 |
| Traction performance | 110 | 112 | 105 | 112 | 110 | 111 | 109 | 109 | 100 | 96 | 94 | 96 | 99 | 108 | 98 |
| Air column resonance noise (new) | 108 | 112 | 102 | 110 | 110 | 112 | 108 | 107 | 100 | 96 | 94 | 96 | 97 | 114 | 98 |
| Pitch noise (worn) | 110 | 108 | 115 | 112 | 111 | 110 | 111 | 111 | 100 | 104 | 106 | 104 | 108 | 97 | 102 |

Depth of main groove D: 12.7 mm
Width of main groove W: 14.0 mm
Length of block L: 40.0 mm From the Table 1, it is found that the tires of the Examples show the improved traction performance and substantially maintained drainage performance and further, pitch noise and air column resonance noise are reduced.

What is claimed is:

1. A pneumatic tire provided with main grooves extending in the tire circumferential direction and transverse grooves connected to the main groove formed on a tread, and with blocks formed by the main grooves and the transverse grooves, wherein the phase difference of the two transverse grooves connected to the main groove is within 25% of the circumferential length of the blocks, and projected portions are alternately provided in both sidewalls of the main groove, the circumferential length of the projected portions is 20% to 45% of the circumferential length of the blocks, in the cross-section of the width direction of the main groove the edge of the projected portions at the groove bottom is 2% to 25% of the width of the main groove from the centerline of the main groove, and the outline of the projected portions is at least on a virtual surface that connects the edge of the main groove at the tread surface and the edge of the projected portions at the groove bottom, and the pneumatic tire is provided with one or a plurality of sub-projected portions further projected away from the virtual surface, toward an imaginary plane extending perpendicular to the main groove bottom and through the center line thereof, the maximum width portion of each of the sub-projected portions being within the range of 30% to 80% of the depth of the main groove, and the width of the maximum width portion being at least not less than 1.0 mm.

2. The pneumatic tire as set forth in claim 1, wherein the sub-projected portion is a triangular shaped in cross-section provided with a rack surface parallel to the tread surface and the height of each rack surface is within the range of 30% to 80% of the depth of the main groove and the width of the rack surface is at least not less than 1.0 mm.

3. The pneumatic tire as set forth in claim 1, wherein the sub-projected portion is triangular shaped in cross-section and the height of two apexes of the sub-projected portion not on the virtual surface is within the range of 30% to 80% of the depth of the main groove, and the width of the sub-projected portion is at least not less than 1.0 mm.

4. The pneumatic tire as set forth in claim 1, wherein the sub-projected portion is quadrangular shaped in cross-section and one side of the sub-projected portion is on the virtual surface and the height of two apexes of the sub-projected portion not on the virtual surface is within the range of 30% to 80% of the depth of the main groove, and the width of the sub-projected portion is at least not less than 1.0 mm.

* * * * *